(12) United States Patent
Teo et al.

(10) Patent No.: US 10,826,608 B2
(45) Date of Patent: *Nov. 3, 2020

(54) LIGHT EMITTING DIODE COMMUNICATION DEVICE, METHOD OF FORMING AND OPERATING THE SAME

(71) Applicant: Agency for Science, Technology and Research, Singapore (SG)

(72) Inventors: Ee Jin Teo, Singapore (SG); Chengyuan Yang, Singapore (SG); Jinghua Teng, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/855,725

(22) Filed: Apr. 22, 2020

(65) Prior Publication Data

US 2020/0259564 A1 Aug. 13, 2020

Related U.S. Application Data

(62) Division of application No. 16/349,812, filed as application No. PCT/SG2017/050550 on Nov. 1, 2017, now Pat. No. 10,666,357.

(30) Foreign Application Priority Data

Nov. 23, 2016 (SG) .......................... 10201609807U

(51) Int. Cl.
*H04B 10/00* (2013.01)
*H04B 10/116* (2013.01)
*H04B 10/114* (2013.01)

(52) U.S. Cl.
CPC ....... *H04B 10/116* (2013.01); *H04B 10/1149* (2013.01)

(58) Field of Classification Search
CPC .. H04B 10/116; H04B 10/1149; H04B 10/40; H04B 10/502; H04B 10/1143;
(Continued)

(56) References Cited

U.S. PATENT DOCUMENTS 7,324,757 B2 1/2008 Wilson et al.
8,540,529 B2 9/2013 Warren et al.
(Continued)

FOREIGN PATENT DOCUMENTS

CN 103312418 A 9/2013
CN 104639243 A 5/2015
(Continued)

OTHER PUBLICATIONS

Schmid et al. "An LED-to-LED Visible Light Communication System with Software-Based Synchronization," 3rd IEEE Workshop on Optical Wireless Communications, 2012, pp. 1264-1268.
(Continued)

*Primary Examiner* — Hibret A Woldekidan
(74) *Attorney, Agent, or Firm* — Winstead PC

(57) ABSTRACT

Various embodiments may relate to a light emitting diode (LED) communication device including a communication interface configured to couple with an electronic device. The LED communication device may also include an electrical interface electrically coupled to the communication interface. The LED communication device may further include a light emitting diode electrically coupled to the electrical interface. The electrical interface may be configured to convert data signals received from the electronic device into driving signals transmitted to the light emitting diode during uplink, and to convert sensing signals received from the light emitting diode into data signals transmitted to the electronic device during downlink. The light emitting diode may be configured to convert the driving signals received from the
(Continued)

electrical interface into a plurality of light pulses during uplink, and to convert a plurality of light pulses received by the light emitting diode into the sensing signals during downlink.

8 Claims, 21 Drawing Sheets

(58) Field of Classification Search
CPC .... H04B 10/11; H04B 10/114; H04B 10/803; G06F 11/325
USPC ........ 398/172, 118, 127, 128, 130, 189, 135
See application file for complete search history.

(56) References Cited

U.S. PATENT DOCUMENTS

| | | | |
|---|---|---|---|
| 8,687,965 B2 * | 4/2014 | Pederson | H04B 10/1149 398/135 |
| 8,873,965 B2 | 10/2014 | Giustiniano et al. | |
| 9,083,769 B2 | 7/2015 | Beel et al. | |
| 9,264,138 B2 | 2/2016 | Schmid et al. | |
| 9,591,730 B2 | 3/2017 | Setomoto et al. | |
| 9,621,266 B2 * | 4/2017 | Breuer | G01S 5/163 |
| 9,705,597 B2 * | 7/2017 | Latham | H04L 12/40 |
| 9,768,868 B2 * | 9/2017 | Pederson | H04B 10/116 |
| 9,871,589 B2 * | 1/2018 | Breuer | G06K 9/34 |
| 10,050,800 B2 | 8/2018 | Beel et al. | |
| 10,164,709 B2 | 12/2018 | Pitwon et al. | |
| 10,187,148 B2 | 1/2019 | Doyle et al. | |
| 10,348,404 B1 | 7/2019 | Herman et al. | |
| 10,406,967 B2 | 9/2019 | Chen | |
| 10,439,714 B2 * | 10/2019 | Ritchie | H04B 17/318 |
| 2009/0121739 A1 * | 5/2009 | Kuo | G01R 19/155 324/764.01 |
| 2010/0232799 A1 * | 9/2010 | Lueck | H04B 10/1149 398/118 |
| 2011/0124418 A1 * | 5/2011 | Walker | A63F 13/95 463/44 |
| 2012/0230696 A1 * | 9/2012 | Pederson | G08B 13/19663 398/115 |
| 2013/0101285 A1 * | 4/2013 | Shar | H04B 10/1149 398/38 |
| 2013/0236183 A1 * | 9/2013 | Chao | H04B 10/116 398/101 |
| 2013/0341515 A1 * | 12/2013 | Akselrod | G01T 1/10 250/363.01 |
| 2014/0082227 A1 | 3/2014 | Beel et al. | |
| 2017/0163439 A1 | 6/2017 | Bosua et al. | |
| 2017/0170220 A1 | 6/2017 | Nam et al. | |
| 2019/0017671 A1 | 1/2019 | Bhakta et al. | |

FOREIGN PATENT DOCUMENTS

| | | |
|---|---|---|
| CN | 105812055 A | 7/2016 |
| CN | 105915284 A | 8/2016 |
| CN | 105959061 A | 9/2016 |

OTHER PUBLICATIONS pureLifi, "LiFi Technology," https://purelifi.com/lifi-technology, 2017, pp. 1-9.

Oldecomm, "Light Fidelity (LiFi) Internet Service Provider Company," https://www.oledcomm.net, 2017, pp. 1-4.

Dung et al., "Demonstration of Low-Complexity LED-to-LED Two-way Visible Light Communication System," International Symposium on Computer, Consumer and Control, 2016, pp. 216-219.

Thomas Newton "PureLiFi Wants to Connect Your Laptop to the Internet with LED Light Bulbs," https://recombu.com/digital/article/purelifi-laptop-dongle-led-bulbs#, Nov. 3, 2014, pp. 1-12.

Written Opinion of the International Searching Authority for International Application No. PCT/SG2017/050550 dated Dec. 22, 2017, pp. 1-6.

* cited by examiner

FIG. 4D

| Dongle Features | Transmitter | Receiver | Lens | 360° Angle Swivel |
|---|---|---|---|---|
| PureLiFi | IR LED | Silicon | Convex | No |
| Oledcomm | None | Silicon | None | No |
| Disney | Visible LED | Visible LED | None | No |
| Embodiment | Visible LED | Visible LED | Convex/Fresnel | Yes |

FIG. 4E

| Embodiment | PureLiFi | Oledcomm | Disney |
|---|---|---|---|
| Compact size ✓✓ | ✓ | ✓ | ✓ |
| Speed ✓ | ✓ | ✗ | ✗ |
| S/N Ratio ✓ | ✓ | ✗ | ✗ |

FIG. 9E

| Features | Spherical lens/mm | Fresnel lens/mm |
|---|---|---|
| Diameter | 10 | 10 |
| Focal length | 11 | 11 |
| Volume (mm$^3$) | 129.9 | 39 |
| Thickness (mm) | 3 | 0.5 |

LIGHT EMITTING DIODE COMMUNICATION DEVICE, METHOD OF FORMING AND OPERATING THE SAME

TECHNICAL FIELD

Various aspects of this disclosure relate to a light emitting diode communication device. Various aspects of this disclosure relate to a method of forming a light emitting diode communication device. Various aspects of this disclosure relate to a method of operating a light emitting diode communication device.

BACKGROUND

With recent breakthroughs, Light Fidelity (Li-Fi) technology based on visible light emitting diodes (LED) for communications may be coming into our homes. PureLi-Fi introduced at the Mobile World Congress 2016 their new product LiFi-X, which is capable of bidirectional communications at a 40 megabits per second (Mbps) data rate. Further, PureLi-Fi, together with Lucibel, has opened the first Li-Fi office in Paris.

A dongle may be required to interface smart devices with LED light source providing communication signals from the Ethernet. However, current dongles may be quite bulky (compared to thumb drives) and may suffer from weak signal-to-noise ratio and slow speed. Current dongles typically use infrared light for uplink as it is not glaring to the eyes.

SUMMARY

Various embodiments may relate to a light emitting diode (LED) communication device. The light emitting diode (LED) communication device may include a communication interface configured to couple with an electronic device. The light emitting diode (LED) communication device may also include an electrical interface electrically coupled to the communication interface. The light emitting diode (LED) communication device may further include a light emitting diode electrically coupled to the electrical interface. The electrical interface may be configured to convert data signals received from the electronic device into driving signals transmitted to the light emitting diode during uplink, and to convert sensing signals received from the light emitting diode into data signals transmitted to the electronic device during downlink. The light emitting diode may be configured to convert the driving signals received from the electrical interface into a plurality of light pulses during uplink, and to convert a plurality of light pulses received by the light emitting diode into the sensing signals during downlink.

Various embodiments may relate to a method of forming a light emitting diode (LED) communication device. The method may include providing a communication interface for coupling with an electronic device. The method may further include electrically coupling an electrical interface to the communications interface. The method may also include electrically coupling a light emitting diode to the electrical interface. The electrical interface may be configured to convert data signals received from the electronic device into driving signals transmitted to the light emitting diode during uplink, and to convert sensing signals received from the light emitting diode into data signals transmitted to the electronic device during downlink. The light emitting diode may be configured to convert the driving signals received from the electrical interface into a plurality of light pulses during uplink, and to convert a plurality of light pulses received by the light emitting diode into the sensing signals during downlink.

Various embodiments may relate to a method of operating a light emitting diode communication device. The method may include coupling a communication interface of the light emitting diode (LED) communication device to an electronic device, the light emitting diode (LED) communication device further including an electrical interface coupled to the communication interface, and a light emitting diode electrically coupled to the electrical interface, and the electrical interface configured to convert data signals received from the electronic device into driving signals transmitted to the light emitting diode during uplink, and to convert sensing signals received from the light emitting diode into data signals transmitted to the electronic device during downlink. The method may also include providing an optical source so that the light emitting diode receives a plurality of downlink light pulses transmitted from the optical source to the light emitting diode, the plurality of downlink light pulses converted into the sensing signals by the light emitting diode. The method may further include providing a photodetector so that the light emitting diode transmits a plurality of uplink light pulses to the photodetector, the plurality of uplink light pulses converted based on the driving signals received by the light emitting diode.

BRIEF DESCRIPTION OF THE DRAWINGS

The invention will be better understood with reference to the detailed description when considered in conjunction with the non-limiting examples and the accompanying drawings, in which:

FIG. 4D shows a table comparing features of one embodiment to other designs.

FIG. 4E shows a table comparing performance of one embodiment to other designs.

FIG. 9E is a table comparing the optical properties of a spherical lens according to various embodiments and a Fresnel lens according to various embodiments.

DETAILED DESCRIPTION

Figure 1:
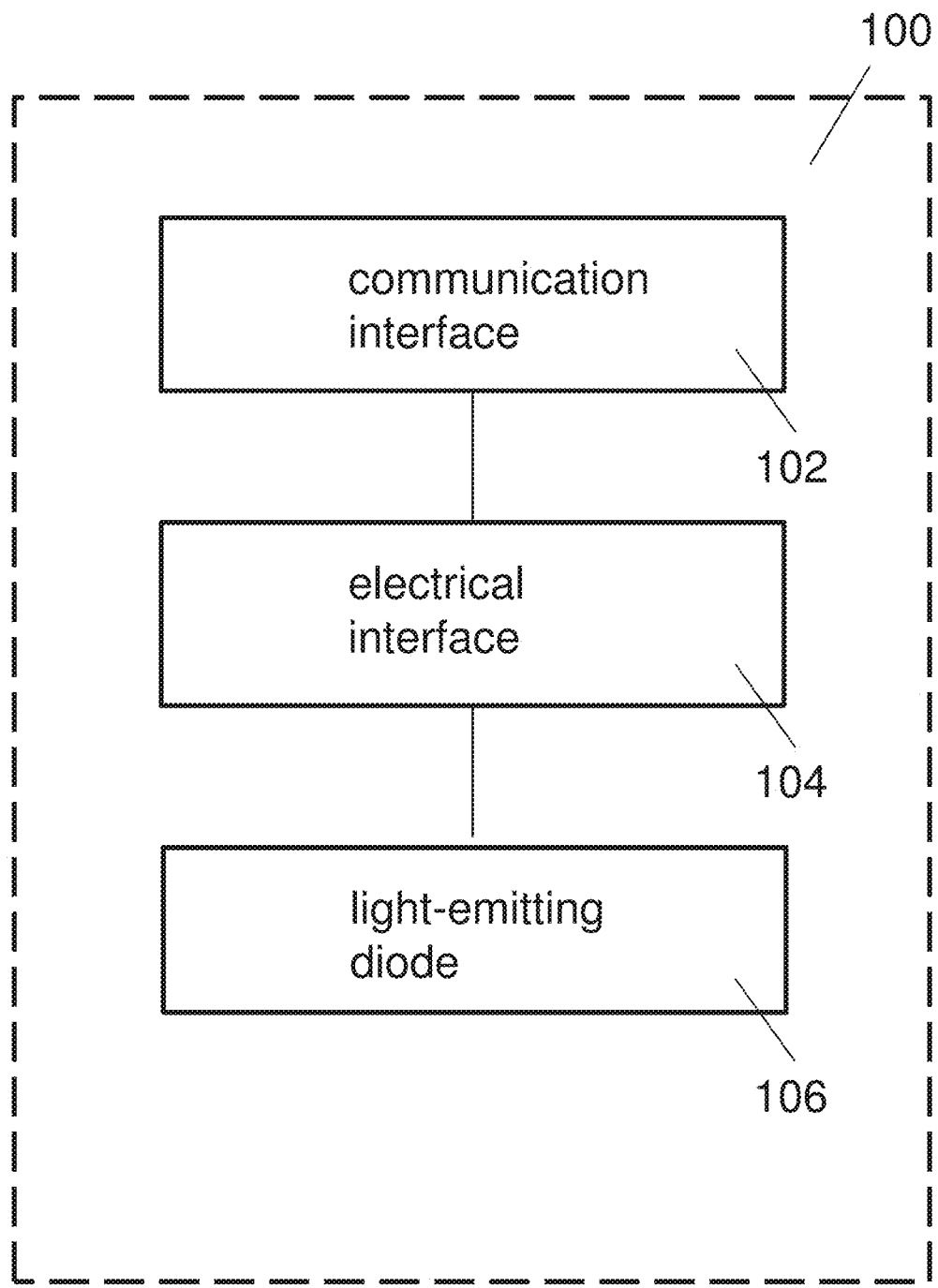
FIG. 1 is a general illustration of a light emitting diode (LED) communication device 100 according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the methods or light emitting diode (LED) communication devices are analogously valid for the other methods or light emitting diode (LED) communication devices. Similarly, embodiments described in the context of a method are analogously valid for a light emitting diode (LED) communication device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may also be used herein to mean that the deposited material may be formed "indirectly on" the implied side or surface with one or more additional layers being arranged between the implied side or surface and the deposited material. In other words, a first layer "over" a second layer may refer to the first layer directly on the second layer, or that the first layer and the second layer are separated by one or more intervening layers. Further, in the current context, a layer "over: or "on" a side or surface may not necessarily mean that the layer is above a side or surface. A layer "on" a side or surface may mean that the layer is formed in direct contact with the side or surface, and a layer "over" a side or surface may mean that the layer is formed in direct contact with the side or surface or may be separated from the side or surface by one or more intervening layers.

The light emitting diode (LED) communication device as described herein may be operable in various orientations, and thus it should be understood that the terms "top", "bottom", etc., when used in the following description are used for convenience and to aid understanding of relative positions or directions, and not intended to limit the orientation of the light emitting diode (LED) communication device.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

FIG. 1 is a general illustration of a light emitting diode (LED) communication device 100 according to various embodiments. The device 100 may include a communication interface 102 configured to couple with an electronic device. The device 100 may also include an electrical interface 104 electrically coupled to the communication interface 102. The device 100 may further include a light emitting diode 106 electrically coupled to the electrical interface 104. The electrical interface 104 may be configured to convert data signals received from the electronic device into driving signals transmitted to the light emitting diode 106 during uplink, and to convert sensing signals received from the light emitting diode 106 into data signals transmitted to the electronic device during downlink. The light emitting diode 106 may be configured to convert the driving signals received from the electrical interface into a plurality of light pulses during uplink, and to convert a plurality of light pulses received by the light emitting diode 106 into the sensing signals during downlink.

In other words, the device 100 may include a communication interface 102 electrically coupled to an electrical interface 104, and a light emitting diode 106 electrically coupled to the electrical interface 104. The light emitting diode 106 may be configured to detect incoming light in addition to emitting light.

Various embodiments may seek to address a problem of slow data transmission. Various embodiments may seek to significantly increase the speed of data transmission. Various embodiments may seek to improve the signal-to-noise ratio faced by conventional devices. Various embodiments may provide a compact device.

The light emitting diode 106 may be configured to detect or sense light, i.e. convert light pulses to electrical sensing signals, in addition to emitting light, i.e. convert electrical driving signals to light pulses. The light emitting diode 106 may be referred to as a light sensing and emitting diode. The light emitting diode (LED) communication device 100 may be referred to as a light emitting and sensing device. The light emitting diode 106 may include a medium including a material, such as a semiconductor material, configured to absorb light of a first predetermined wavelength or range of wavelengths, and configured to emit light of a second predetermined wavelength or range of wavelengths. In various embodiments, the first predetermined wavelength or range of wavelengths may overlap with the second predetermined wavelength or range of wavelengths. In various other embodiments, the first predetermined wavelength or range of wavelengths may not overlap with the second predetermined wavelength or range of wavelengths.

In various embodiments, the plurality of light pulses Which are converted from the driving signals by the light emitting diode may be referred to as uplink light pulses. In various embodiments, the plurality of light pulses which are to be converted into the sensing signals by the light emitting diode may be referred to as downlink light pulses. In various embodiments, uplink light may include the plurality of uplink light pulses. In various embodiments, downlink light may include the plurality of downlink light pulses. In various embodiments, the light pulses may be visible light pulses, and the light may be visible light.

The plurality of uplink light pulses and/or the plurality of downlink light pulses may be rapid pulses. The frequency of the light pulses may be more than about 60 Hz, so that the human observer will always perceive an always-on optical signal.

The light emitting diode (LED) communication device 100 may include a first housing part including the communication interface 102. The light emitting diode (LED) communication device 100 may include the light emitting diode 106 and the electrical interface 104. The housing first part and the second housing part may be configured to be rotatable relative to each other. The first housing part and the second housing part may be configured to be rotatable to any value in a range from 0° to 360° relative to each other.

In various embodiments, the light emitting diode 106 may be configured to emit or transmit green light, and to receive white light. The white light may for instance be emitted from a phosphor-coated light emitting diode (i.e. an external phosphor-coated light emitting diode) by exciting the phosphors coating with blue light emitting diode. The green light may be of one or more wavelengths selected from a range of 495 nm to 570 nm, e.g. about 500 nm.

In various embodiments, the light emitting diode 106 may be configured to absorb components of the received light having a wavelength equal or less than 500 nm. The light emitting diode may configured to reject (i.e. not to absorb) components of the received light having a wavelength of more than 500 nm. In various embodiments, the light emitting diode 106 may include a semiconductor material having a bandgap of about 2.34 eV. In various embodiments the semiconductor material may have a bandgap of any value greater than 2.34.

In various embodiments, the light emitting diode 106 may be green, blue, or a green-blue, so that the LED may be configured to absorb only blue light and/or green light, while filtering out yellow light, which are slower. The semiconductor material may have a bandgap higher than a bandgap corresponding to the slow yellow phosphor emission. Various embodiments may result in faster white light modulation.

In various embodiments, the light emitting diode 106 may be configured to transmit or emit one or more selected from a group consisting of a green light (may be of one or more wavelengths selected from a range of 495 nm to 530 nm), a blue or violet light (may be of one or more wavelengths selected from a range of 420 nm to 495 nm), and a blue-green light (may be of one or more wavelengths selected from a range of 450 nm to 530 nm). The light emitting diode 106 may be configured to receive white light. The white light may be emitted from a phosphor-coated light emitting diode (i.e. an external phosphor-coated light emitting diode) by exciting the phosphors coating with ultraviolet (UV) light or violet light. The UV light may be of one or more wavelengths selected from a range of 10 nm to 400 nm. The violet light may be of one or more wavelengths selected from a range of 380 nm to 450 nm.

In various embodiments, the light emitting diode 106 may be configured to absorb components of the received light having a wavelength less than 980 nm and reject (i.e. not to absorb) components of the received light having a wavelength more 980 nm. The semiconductor material may include a semiconductor material having a bandgap of any value smaller than 2.34 eV.

In various embodiments, the light emitting diode 106 may be configured to transmit or emit one or more selected from a group consisting of a yellow light, an orange light, a red light, and an infrared light. In various embodiments, the LED may be configured to absorb partially or the whole white spectrum, including the slow yellow phosphors component. This may result in small or negligible increase in speed of white light modulation. The semiconductor material may have a bandgap equal or smaller than the bandgap corresponding to the slow yellow phosphor emission.

In various embodiments, the light emitting diode 106 may have a first area configured to transmit or emit light pulses (i.e. convert the driving signals received from the electrical interface into the plurality of light pulses during uplink), and may have a second area, the second area different from the first area, configured to receive light pulses (i.e. convert the plurality of light pulses received by the light emitting diode into the sensing signals during downlink). The first area may overlap or may not overlap with the second area.

In various embodiments, the light emitting diode (LED) communication device 100 may further include a lens structure over the light emitting diode 106, the lens structure configured to focus light into the light emitting diode 106. The lens structure may further include a substantially flat surface facing away from the light emitting diode. The lens structure may be any one selected from a group consisting of a Fresnel lens, a convex lens and a lens array. The lens structure may be a collimating lens. The lens structure and the light emitting diode 106 may be arranged so that the light emitting diode 106 is at the focal length of the lens structure.

In various embodiments, a surface anchor substrate of the light emitting diode may include a plurality of patterns, e.g. pits. In various embodiments, the plurality of patterns may be or may include a plurality of V-shaped pits, cones or cylinders to improve the light absorption and extraction efficiency.

In various embodiments, the light emitting diode 106 may include a semiconductor, for instance an inorganic semiconductor such as indium gallium nitride (InGaN), gallium phosphide (GaP), aluminium gallium indium phosphide (AlGaInP), aluminium gallium phosphide (AlGaP), zinc selenide (ZnSe), gallium phosphide (GaP), gallium arsenide (GaAs), aluminium gallium arsenide (AlGaAs), gallium arsenic phosphide (GaAsP), or an organic semiconductor such as C545T. In various embodiments, when the light emitting diode 106 is configured to receive white light and to transmit one or more selected from a group consisting of a green light, a blue or violet light, and a blue-green light, the light emitting diode may include indium gallium nitride (InGaN), zinc selenide (ZnSe), aluminium gallium phosphide (AlGaP), aluminium gallium indium phosphide (AlGaInP), gallium phosphide (GaP). In various embodiments, when the light emitting diode 106 is configured to receive white light and configured to transmit one or more selected from a group consisting of a yellow light, an orange light, a red light, and an infrared light, the light emitting diode may include aluminium gallium indium phosphide (AlGaInP), gallium phosphide (GaP), gallium arsenide (GaAs), aluminium gallium arsenide (AlGaAs) or gallium arsenic phosphide (GaAsP).

The communication interface 104 may be an universal serial bus (USB) interface. The USB interface may be configured to an USB port of the electronic device. The electronic device may be a computing device such as a desktop computer, a laptop computer, a tablet computer. The electronic device may also be a consumer electronic device such as a video camera, a camera, or a telecommunication device such as a mobile device.

The communication interface 104 may alternatively be, for instance, FireWire connector, a Thunderbolt connector, or an Ethernet connector.

The electrical interface 104 may also be referred to as a coupling circuit arrangement or a converter. The electrical interface 104 may include a circuit arrangement configured to provide a suitable voltage or a suitable power to the light emitting diode for wireless communication. The suitable voltage or the suitable power may be from the electronic device e.g. laptop or computer through the communication interface, e.g. the USB. The suitable voltage may be about 5 V.

The light emitting diode (LED) communication device 100 may be a dangle.

The light emitting diode (LED) communication device 100 may include one or more further of light emitting diodes to form a plurality of light emitting diodes. Various embodiments may provide an optical communication array including a plurality of light emitting diodes. The plurality of light emitting diodes may be electrically coupled to the electrical interface 104.

The electrical interface 104 may include a circuit arrangement configured to provide the suitable voltage or the suitable power to the plurality of light emitting diodes. The plurality of light emitting diodes may include a semiconductor material such as indium gallium nitride (InGaN). In various embodiments, the plurality of light emitting diodes may be configured to reject components of the received light having a wavelength of more than 500 nm and absorb components of the received light having a wavelength equal or less than 500 nm. The plurality of light emitting diodes may include a semiconductor material such as aluminium gallium arsenide (AlGaAs). In various embodiments, the plurality of light emitting diodes may be configured to absorb components of the received light having a wavelength less than 980 nm and reject components of the received light having a wavelength more than 980 nm. Each of the plurality of light-emitting diodes may include a surface and/or substrate with a plurality of patterns.

The electrical interface 104 may include a circuit arrangement configured to provide a suitable voltage or a suitable power to one or more light emitting diodes for wireless communication. The circuit arrangement may include modulation and amplification circuits to drive the light emitting diode or LED array and de-modulation and amplification circuits to detect the sensing signals.

In various embodiments, each of the plurality of light emitting diodes may be configured to convert the driving signals received from the electrical interface 104 into a plurality of light pulses during uplink, and to convert a plurality of light pulses received by the light emitting diode into the sensing signals during downlink. The device 100 may further include a lens structure to focus light into the plurality of light emitting diodes. The lens structure may include a substantially flat surface facing away from the plurality of light emitting diodes.

In various embodiments, the plurality of light emitting diodes may be configured to transmit green light and to receive white light. In various embodiments, the plurality of light emitting diodes may be configured to transmit one or more selected from a group consisting of a green light, a blue light, and a blue-green light, and to receive white light.

In various embodiments, the plurality of light emitting diodes may be configured to transmit one or more selected from a group consisting of an infrared light, a red light, an orange light and a yellow light, and to receive white light.

In various embodiments, different light emitting diodes of the plurality of light emitting diodes may be used for absorption or emission. For instance, a first light emitting diode of the plurality of light emitting diodes may be configured to emit light pulses, i.e. convert the driving signals received from the electrical interface 104 into the plurality of light pulses during uplink, while a second light emitting diode of the plurality of light emitting diodes may be configured to receive light pulses, i.e. convert the plurality of light pulses received by the light emitting diode into the sensing signals during downlink.

Various embodiments may provide an optical communication system. The optical communication system may include a light emitting diode (LED) communication device as described herein. The optical communication system may also include an optical source configured to transmit the plurality of light pulses to the light emitting diode to be converted into the sensing signals during downlink. The optical communication system may also include a photodetector configured to receive the plurality of light pulses from the light emitting diode converted based on the driving signals during uplink.

Figure 2:
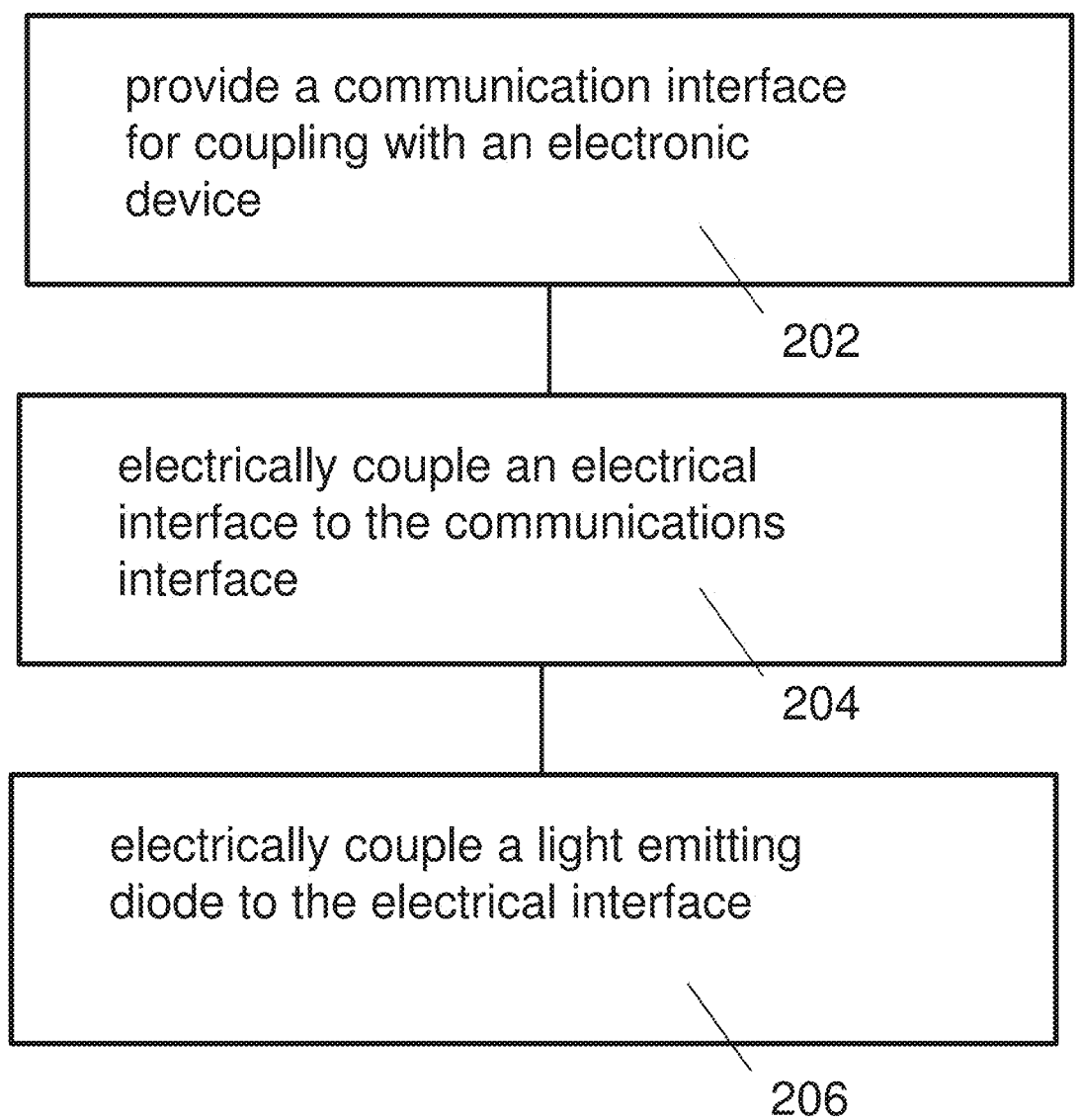
FIG. 2 illustrates a method of forming a light emitting diode (LED) communication device according to various embodiments.

FIG. 2 illustrates a method of forming a light emitting diode (LED) communication device according to various embodiments. The method may include, in 202, providing a communication interface for coupling with an electronic device. The method may include, in 204, electrically coupling an electrical interface to the communications interface. The method may also include, in 206, electrically coupling a light emitting diode to the electrical interface.

The electrical interface may be configured to convert data signals received from the electronic device into driving signals transmitted to the light emitting diode during uplink, and to convert sensing signals received from the light emitting diode into data signals transmitted to the electronic device during downlink. The light emitting diode is configured to convert the driving signals received from the electrical interface into a plurality of light pulses during uplink, and to convert a plurality of light pulses received by the light emitting diode into the sensing signals during downlink.

The method may also include forming the light emitting diode comprising forming a first doped layer on a substrate, an active layer on the first doped layer and a second doped layer on the active layer. The active layer may be between the first doped layer and the second doped layer. The first doped layer may include dopants of a first polarity. The second doped layer may include dopants of a second polarity opposite the first polarity. The active layer may include a semiconductor material emitting at wavelength corresponding to a bandgap of the semiconductor material.

The method may also include forming a plurality of v-shaped pits on the second doped layer by etching or growth. The plurality of v-shaped pits may alternatively be formed during forming the second doped layer when materials are deposited to form the second doped layer.

The method may also include forming a plurality of structures on the surface and/or substrate by lithography or nanoimprinting and etching.

In various embodiments, the communication interface may be provided on a first housing part so that the communication interface extends from the first housing part. The light emitting diode and the electrical interface may be attached to a second housing part.

The housing first part and the second housing part may be configured to be rotatable relative to each other.

Figure 3:
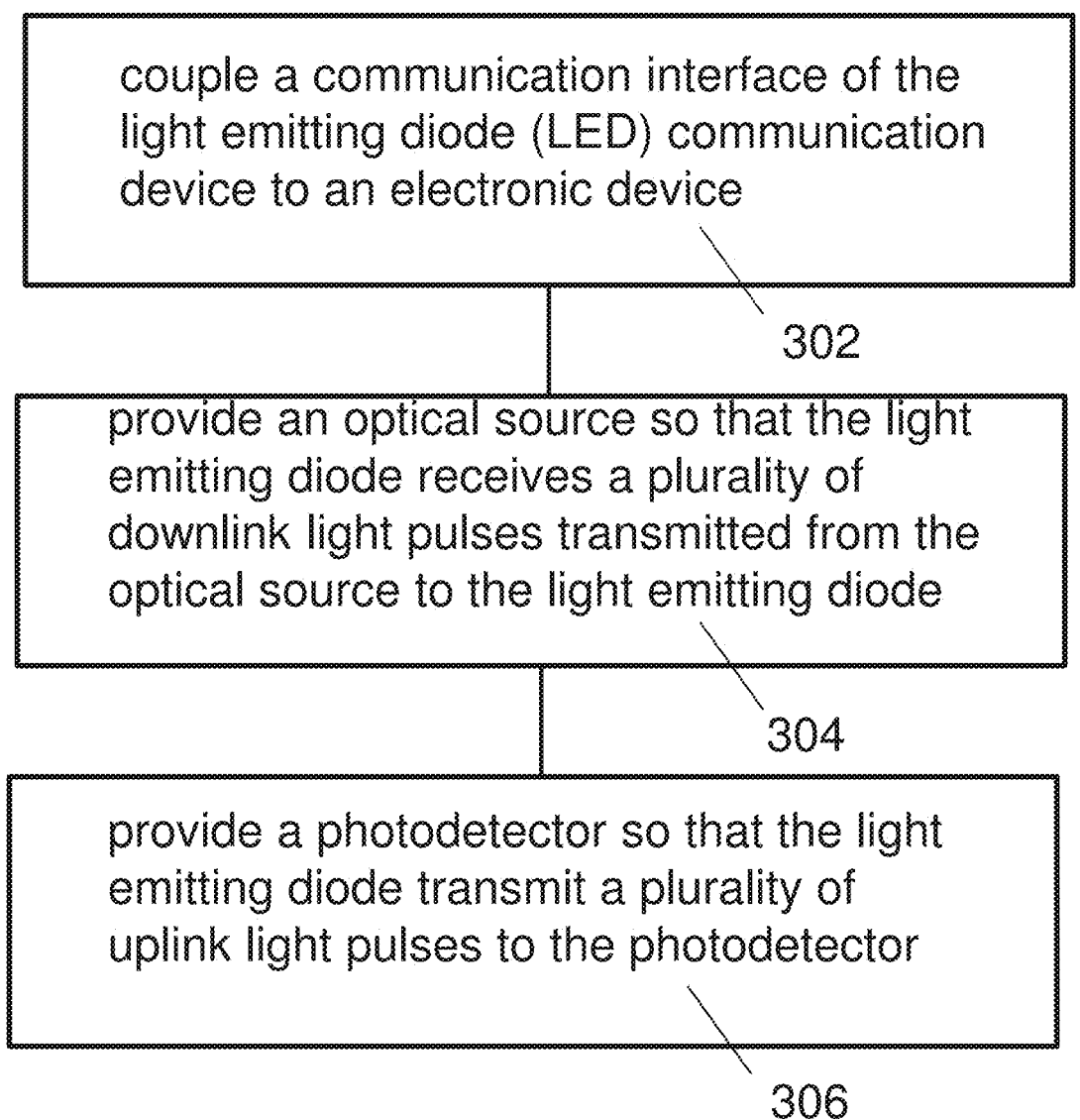
FIG. 3 illustrates a method of operating a light emitting diode (LED) communication device according to various embodiments.

FIG. 3 illustrates a method of operating a light emitting diode (LED) communication device according to various embodiments. The method may include, in 302, coupling a communication interface of the light emitting diode (LED) communication device to an electronic device, the light emitting diode (LED) communication device further comprising an electrical interface coupled to the communication interface, and a light emitting diode electrically coupled to the electrical interface. The electrical interface is configured to convert data signals received from the electronic device into driving signals transmitted to the light emitting diode during uplink, and to convert sensing signals received from the light emitting diode into data signals transmitted to the electronic device during downlink. The method may further include, in 304, providing an optical source so that the light emitting diode receives a plurality of downlink light pulses transmitted from the optical source to the light emitting diode, the plurality of downlink light pulses converted into the sensing signals by the light emitting diode. The method may also include, in 306, providing a photodetector so that the light emitting diode transmit a plurality of uplink light pulses to the photodetector, the plurality of uplink light pulses converted based on the driving signals received by the light emitting diode.

The downlink light may be phosphor-based white light. The uplink light may be one or more selected from a group consisting of a green light, a blue light, and a blue-green light. The light emitting diode may be configured to reject components of the downlink light having a wavelength of more than 500 nm. The light emitting diode may be configured to absorb components of the downlink light having a wavelength equal or less than 500 nm.

The uplink light may be one or more selected from a group consisting of a yellow light, an orange light, a red light and an infrared light. The light emitting diode may be configured to reject components of the downlink light having a wavelength more than 980 nm and to absorb components of the downlink light having a wavelength less than 980 nm.

The plurality of downlink light pulses may carry information to the electronic device via the communication interface. The plurality of uplink light pulses may carry information from the electronic device via the communication interface. The information may be organized in binary bits, i.e. in a series of "1" and "0".

As highlighted above, Li-Fi may be becoming increasingly popular. Instead of replacing Wi-Fi, Li-Fi may complement Wi-Fi as a faster, more secure and energy-efficient form of wireless communications, Li-Fi may help relieve congested Wi-Fi networks and enable Internet-of-Things (IoT). In Singapore, Li-Fi technology may be well-aligned with the drive towards Smart Nation Living.

Figure 4A:
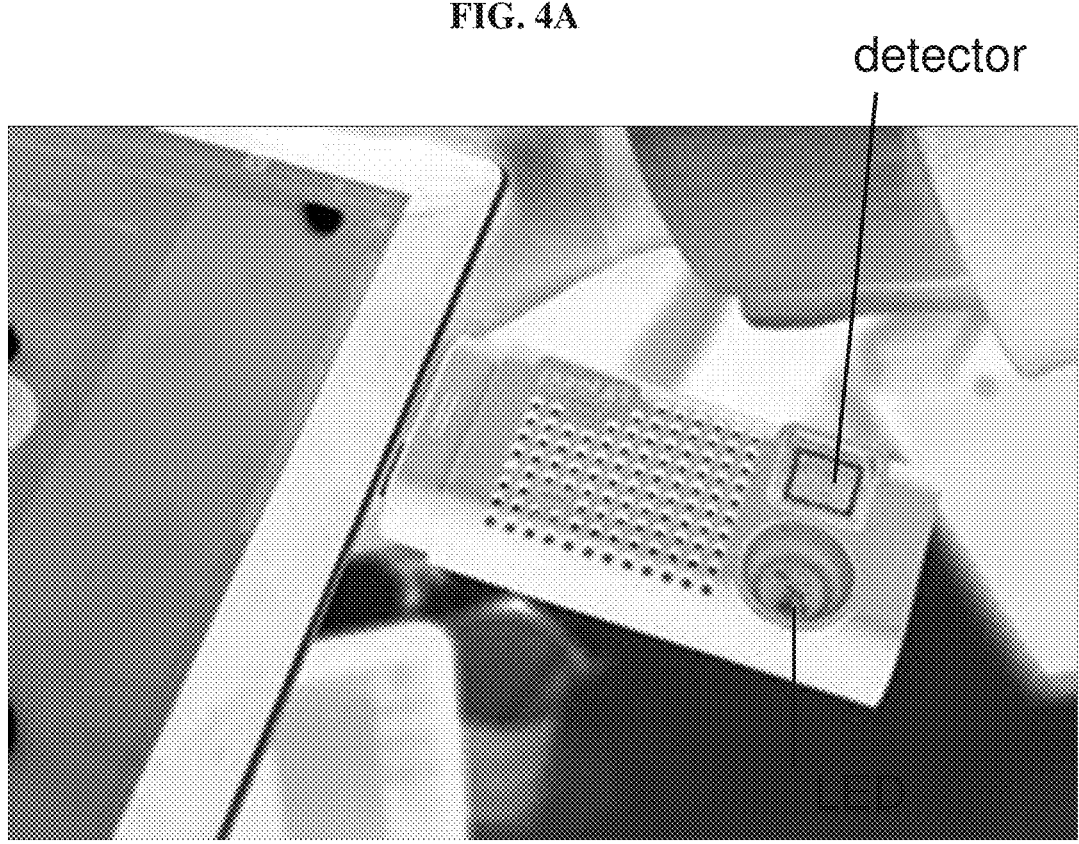
FIG. 4A shows an image of the dongle from PureLiFi.

Li-Fi has also attracted much attention worldwide due to recent major breakthroughs. PureLiFi has introduced its first USB LiFi-X dongle, with a data rate of 40 Mbps, at the Mobile World Congress 2016. FIG. 4A shows an image of the dongle from Purelifi.

A dongle may be required to interface the smart devices with the LED light source providing communication signals from Ethernet. A dongle may include an optical transceiver to convert to/from electrical/optical signals, and may also include amplification, modulation circuitry.

LiFi-X dongle uses infrared LEDs for uplink and detect white light from ceiling lights using a silicon photodiode. However, it does not have a swivel and this may limit optimal light collection. The slow decay of white phosphors LEDs also limits the modulation speed to 1-5 MHz and additional blue filter may have to be used. Sophisticated modulation schemes are needed to increase data transmission speeds to 40 Mbps. However, doing so may increase the bit-error-rate.

Another important factor to consider for a dongle design is size. A compact design would be more desirable and acceptable to consumers compared to a bulky one. As shown in FIG. 4A, the PureLiFi-X dongle has a transmitter with a convex lens, and a separate receiver.

Figure 4B:
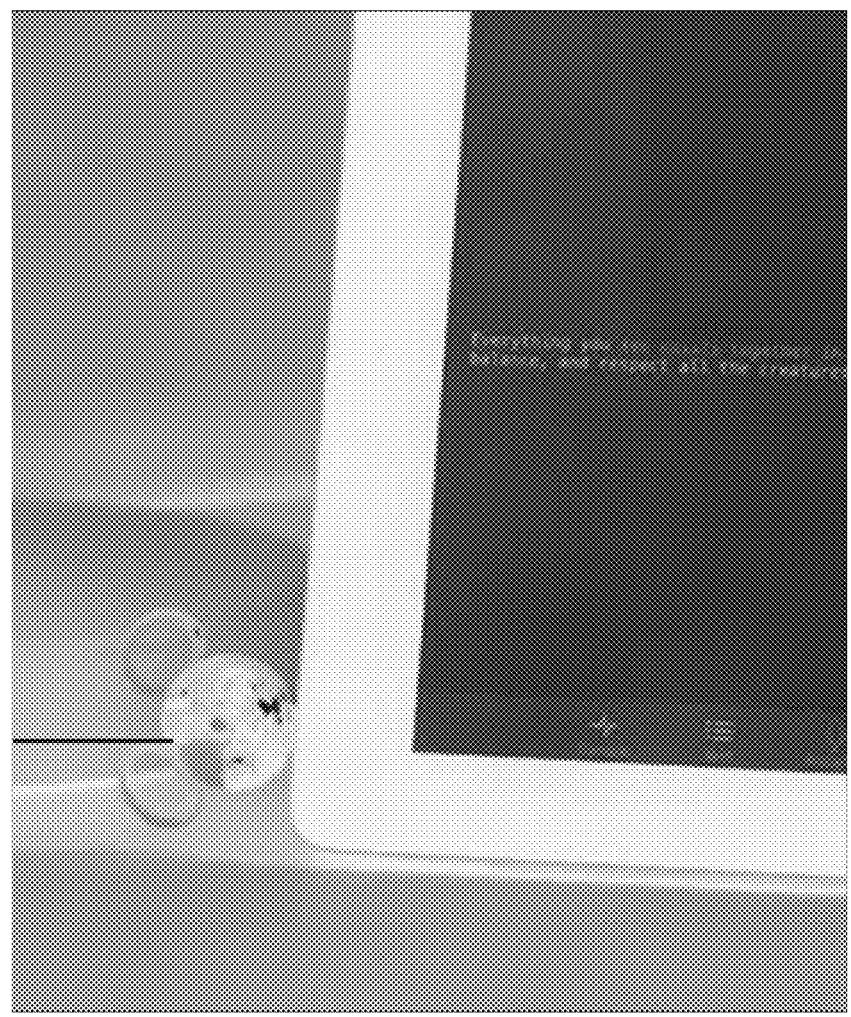
FIG. 4B shows an image of the dongle from Disney.

Other companies who demonstrated VLC include Disney and Oledcomm. Disney has demonstrated LED-to-LED communications with relatively slow data rates of 1.0 kbps for applications in Internet-of-Things (IoT) and smart toys. FIG. 4B shows an image of the dongle from Disney. The Disney dongle uses a spherical lens with no swivel. The Disney dongle may be limited by the poor detection responsivity of InGaN LED, which limits the range to a range of few tens of centimetres.

Figure 4C:
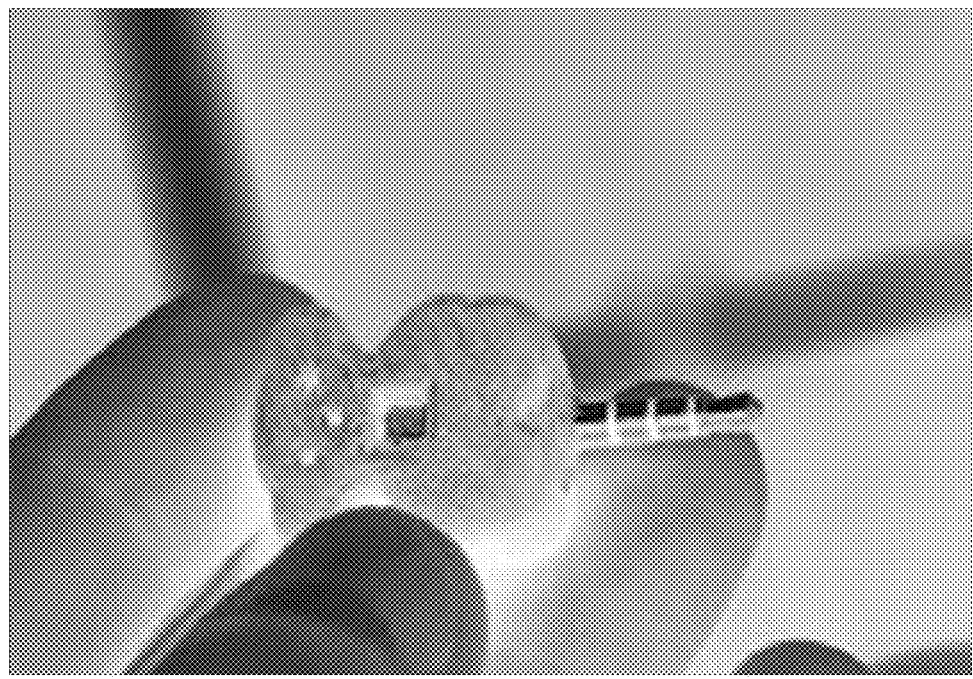
FIG. 4C shows an image of the dongle from Oledcomm.

FIG. 4C shows an image of the dongle from Oledcomm The dongle from Oledcomm is a simple design with just a single detector and no lens in front of it for one-way communication.

FIG. 4D shows a table comparing features of one embodiment to other designs. FIG. 4E shows a table comparing performance of one embodiment to other designs.

The Lifi-X dongle has a relatively fast speed of about 40 megabits per second (Mbps) but has a large size of about 2-3 thumb drives. The Disney dongle is relatively compact but is very slow (in the range of kilobits per second), and has poor signal to noise ratio. The Oledcomm dongle is very compact, but can only be used for download and is also slow.

Figure 5A:
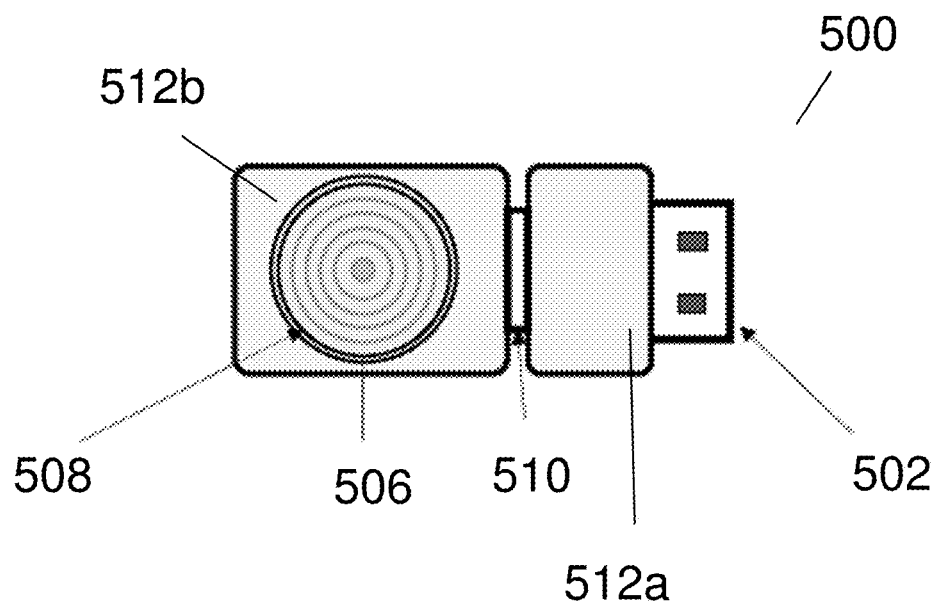
FIG. 5A shows a top planar view of a light emitting diode (LED) communication device according to various embodiments.
Figure 5B:
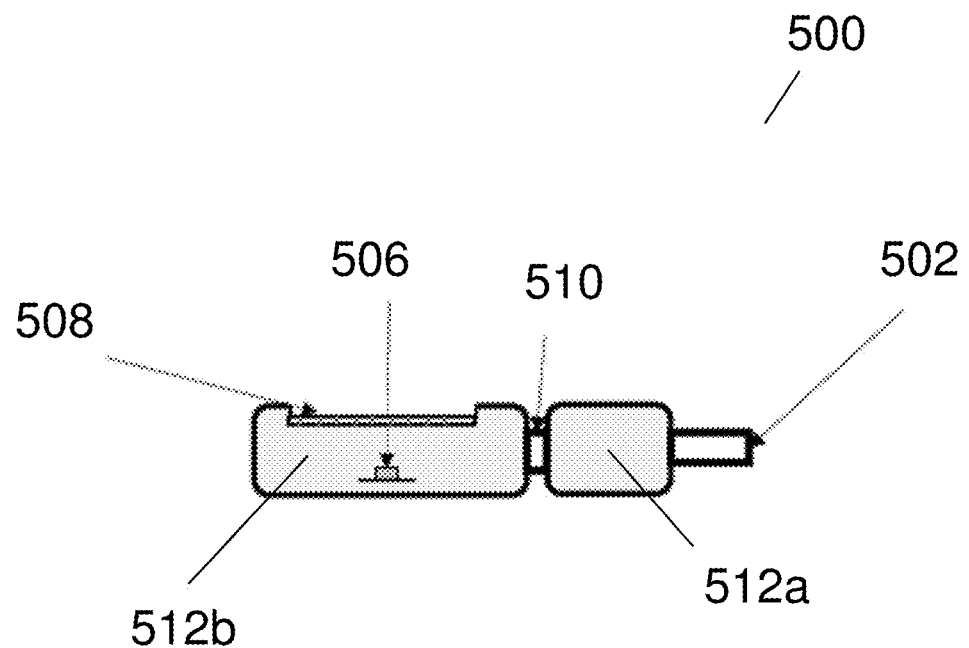
FIG. 5B shows a side view of the light emitting diode (LED) communication device shown in FIG. 5A.

FIG. 5A shows a top planar view of a light emitting diode (LED) communication device 500 according to various embodiments. FIG. 5B shows a side view of the light emitting diode (LED) communication device 500 shown in FIG. 5A according to various embodiments. The device 500 may include a communication interface 502, such as a Universal Serial Bus (USB) interface or connector, configured to couple with an external electronic device.

The device 500 may also include an electrical interface (not shown in FIGS. 5A-B) electrically coupled to the communication interface 502. The device 500 may further include a light emitting diode (LED) 506 electrically coupled to the electrical interface.

The electrical interface may be configured to convert data signals received from the electronic device into driving signals transmitted to the light emitting diode (LED) 506 during uplink, and to convert sensing signals received from the light emitting diode (LED) 506 into data signals transmitted to the electronic device during downlink. The light emitting diode (LED) 506 may be configured to convert the driving signals received from the electrical interface into a plurality of light pulses during uplink, and to convert a plurality of light pulses received by the light emitting diode (LED) 506 into the sensing signals during downlink.

The device 500 may further include a lens structure 508, such as a convex/Fresnel lens over the light emitting diode (LED) 506. The convex/Fresnel lens 508 may be configured to collimate the light and focus the light onto the light emitting diode 506, which may also be a detector. The device 500 may also include a swivel 510.

The device 500 may have a first housing part 512a on Which the USB interface or connector 502 extends out from. The device 500 may have a second housing part 512b housing or holding the light emitting diode (LED) 506. The convex/Fresnel lens 508 may be on the second housing part 512b. The swivel 510 may connect the first housing part 512a and the second housing part 512b, and may be configured so that the first housing part 512a and the second housing part 512b are rotatable to any value in a range from 0° to 360° relative to each other. In other words, the swivel 510 may be a 360° angle swivel. The swivel 510 may be important to optimize the SNR. Various embodiments may have a more compact design with higher speed and SNR compared to existing devices.

Figure 5C:
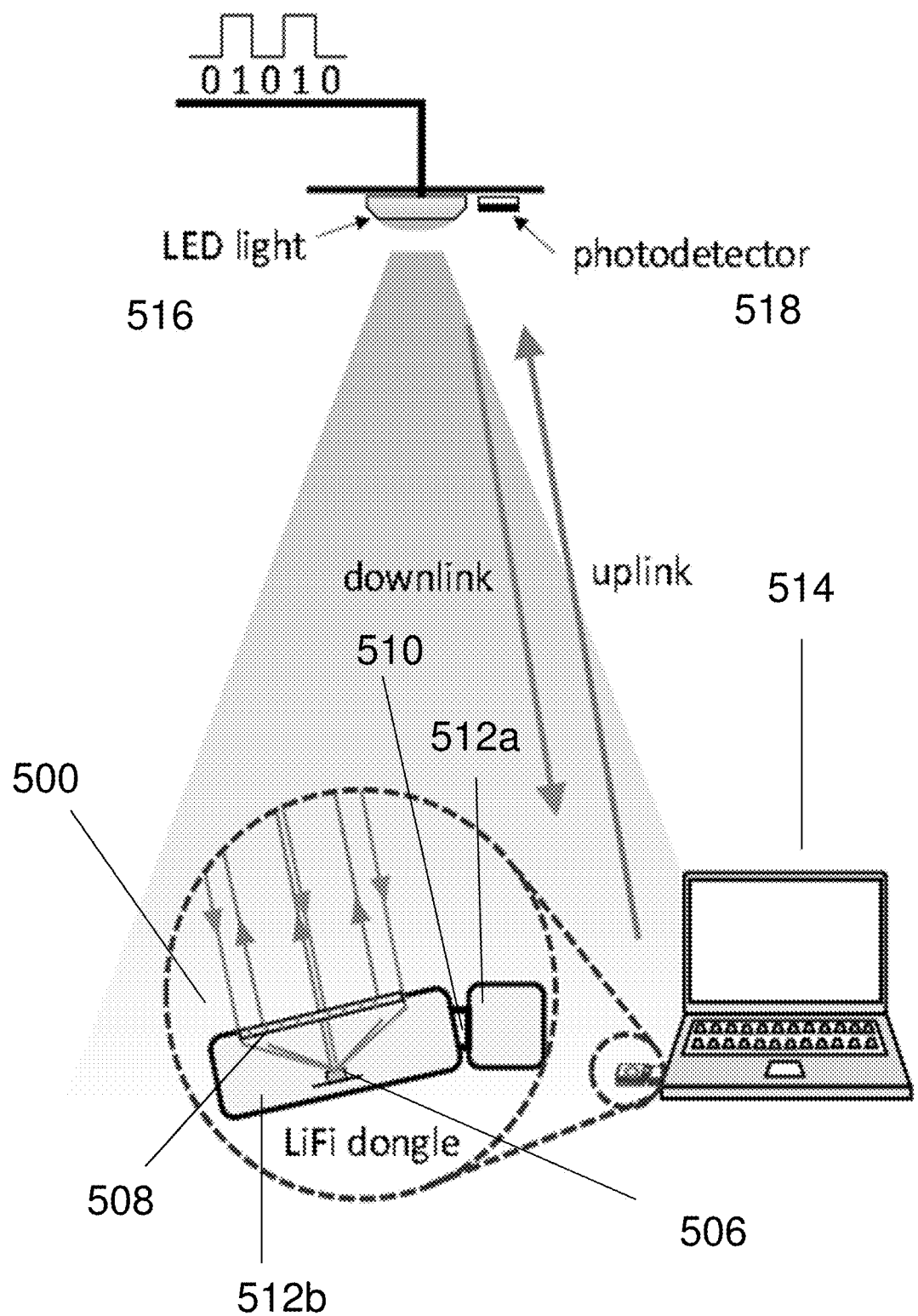
FIG. 5C illustrates the operation of the light emitting diode (LED) communication device shown in FIG. 5A and FIG. 5B according to various embodiments.

FIG. 5C illustrates the operation of the light emitting diode (LED) communication device 500 shown in FIG. 5A and FIG. 5B according to various embodiments. FIG. 5C shows LED-to-LED communications between a laptop 514, ceiling lights 516 (e.g. LED lights), and detector 518 (e.g. a photodetector) through the use of a dongle 500. The dongle 500 may be plugged into the laptop 514. The Fresnel lens 508 may be used to focus incoming light and collimate outgoing light. The swivel 510 may be pointed towards the LED ceiling lights 516 for maximum light collection.

A green textured light emitting diode (LED) 506 may be selected for green light transmission and white light detection. One of the problems faced with using LED for detection is its poor responsivity. This means the range may be limited to tens of centimetres Surface and/or substrate patterning may be employed to improve both the emission and absorption spectra for longer range of communications.

Figure 6A:
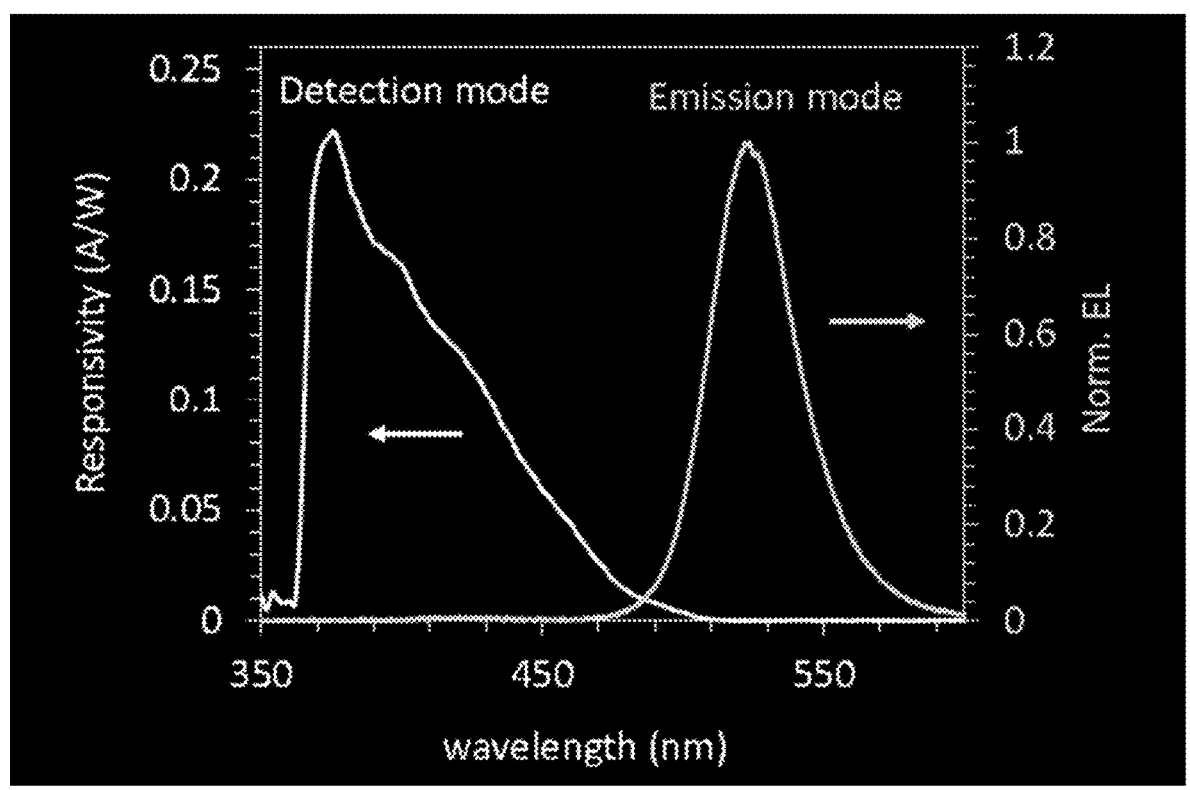
FIG. 6A is a plot of responsivity (in amperes per watt or A/W)/normalized electroluminescence (EL) as a function wavelength (in nanometres) showing the electroluminescence and responsivity curve of a textured green light emitting diode (LED) according to various embodiments.

FIG. 6A is a plot of responsivity (in amperes per watt or A/W)/normalized electroluminescence (EL) as a function wavelength (in nanometres) showing the electroluminescence and responsivity curve of a textured green light emitting diode (LED) according to various embodiments.

The textured green light emitting diode (LED) has enhanced emission spectrum and responsivity. The shape wavelength selectivity may be used to reject any wavelengths above wavelengths pertaining to green. As such, the LED may be used to detect the fast blue component and to reject the slow yellow phosphors component from white light.

Figure 6B:
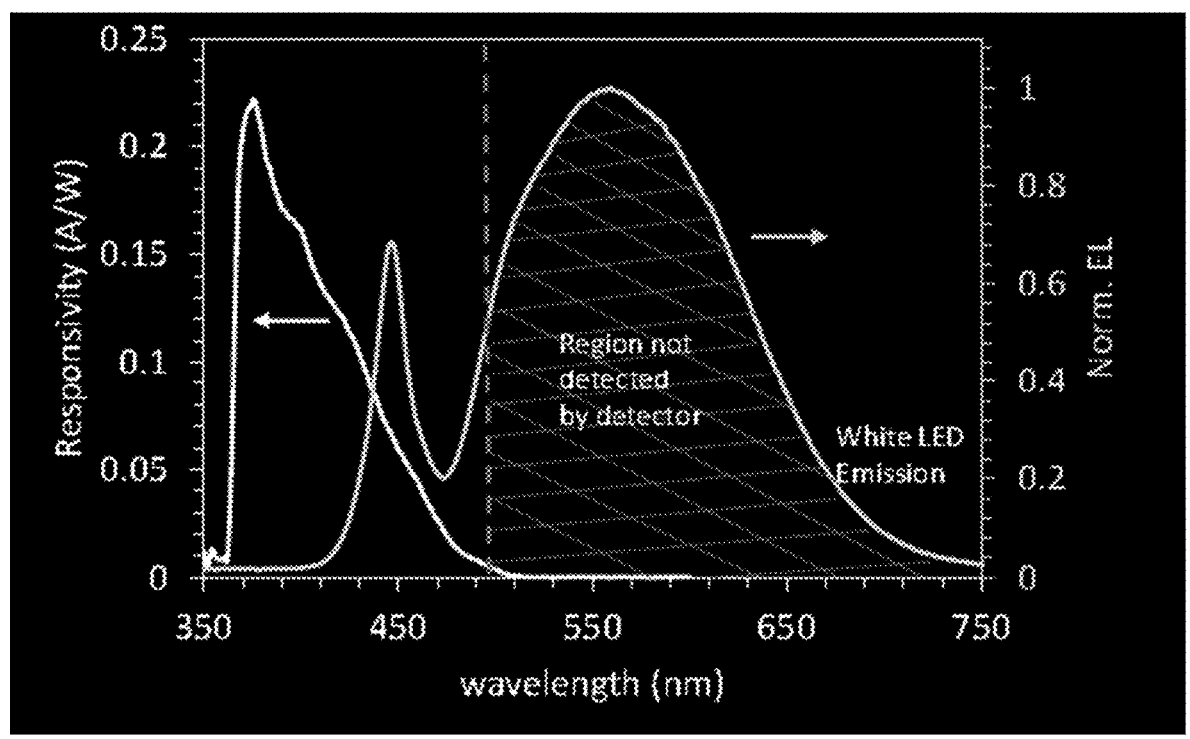
FIG. 6B is a plot of responsivity (in amperes per watt or A/W)/normalized electroluminescence (EL) as a function wavelength (in nanometres) showing white light emission overlaid with the responsivity curve of a green light emitting diode (LED) according to various embodiments.

FIG. 6B is a plot of responsivity (in amperes per watt or A/W)/normalized electroluminescence (EL) as a function wavelength (in nanometres) showing white light emission overlaid with the responsivity curve of a green light emitting diode (LED) according to various embodiments. FIG. 6B shows that only blue components may be detected by the green LED. The slow yellow phosphor component from the white ceiling LED lights may be mostly rejected by the green LED.

Tests have been carried out comparing the speed of modulation that can be achieved by using a conventional silicon photodiode and a green LED when illuminated by a White phosphor LED placed about 0.5 m away.

Figure 7A:
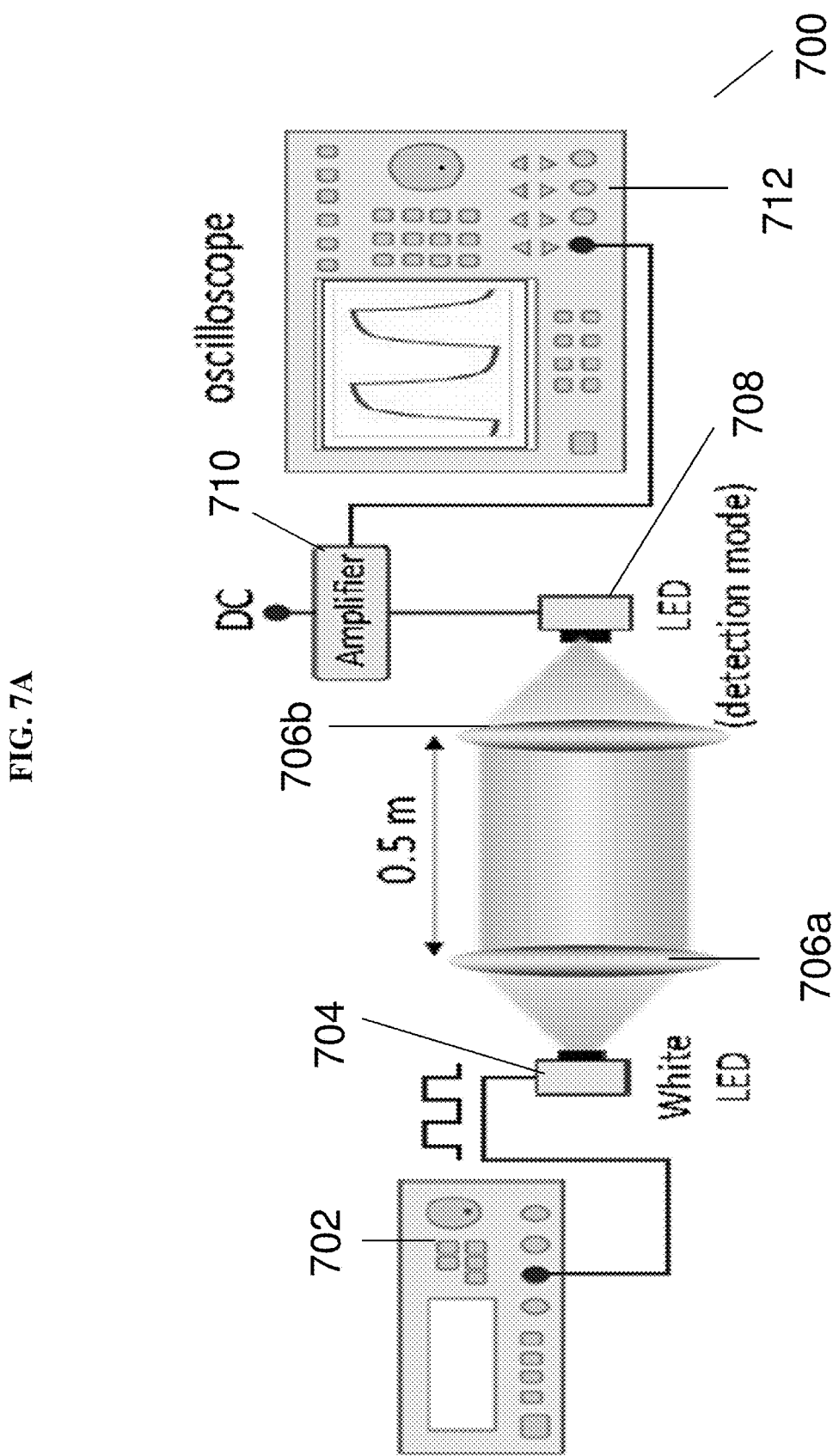
FIG. 7A is a schematic showing a setup to measure the modulation speed of a detector according to various embodiments.

FIG. 7A is a schematic showing a setup 700 to measure the modulation speed of a detector according to various embodiments. The setup 700 may include a White light emitting diode (LED) 702 coupled to a pulse generator 704. The light emitted by the white LED may be directed by lens 706a, 706b to a detector 708. As highlighted above, a conventional silicon photodiode and a green LED is tested as the detector 708. The electrical signal generated by the detector 708 may be amplified by an amplifier 710 before being transmitted to an oscilloscope 712.

Figure 7B:
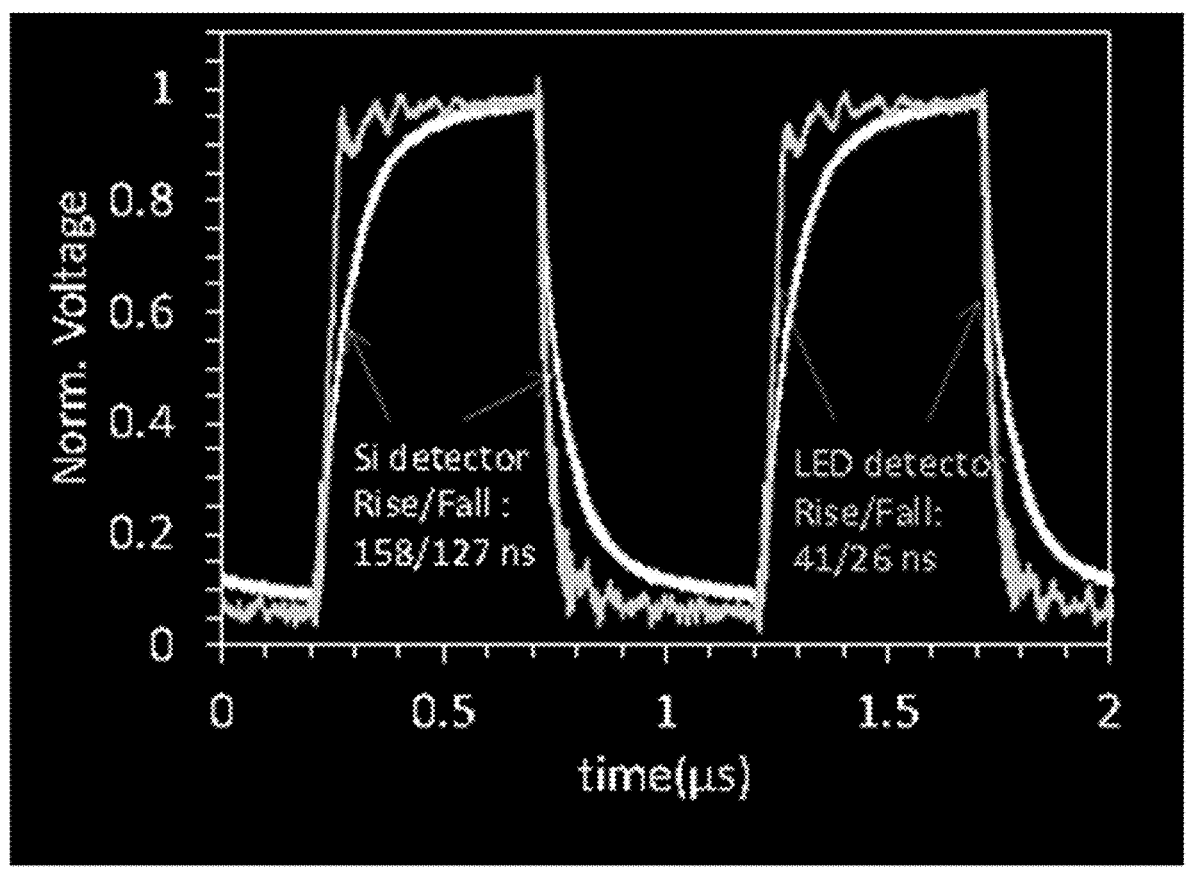
FIG. 7B shows a plot of normalized voltage as a function of time (in microseconds or µs) showing the rise time and fall time of signals due to detection of light pulses by a silicon photodiode and by a green light emitting diode (LED) according to various embodiments.

FIG. 7B shows a plot of normalized voltage as a function of time (in microseconds or μs) showing the rise time and fall time of signals due to detection of light pulses by a silicon photodiode and by a green light emitting diode (LED) according to various embodiments. The silicon photodiode exhibits a rise time of 158 ns and a fall time of 127 ns, while the green LED exhibits a rise time of 41 ns and a fall time of 26 ns. FIG. 7B shows that the LED may reduce rise time/fall time by 4 times or 5 times.

Figure 7C:
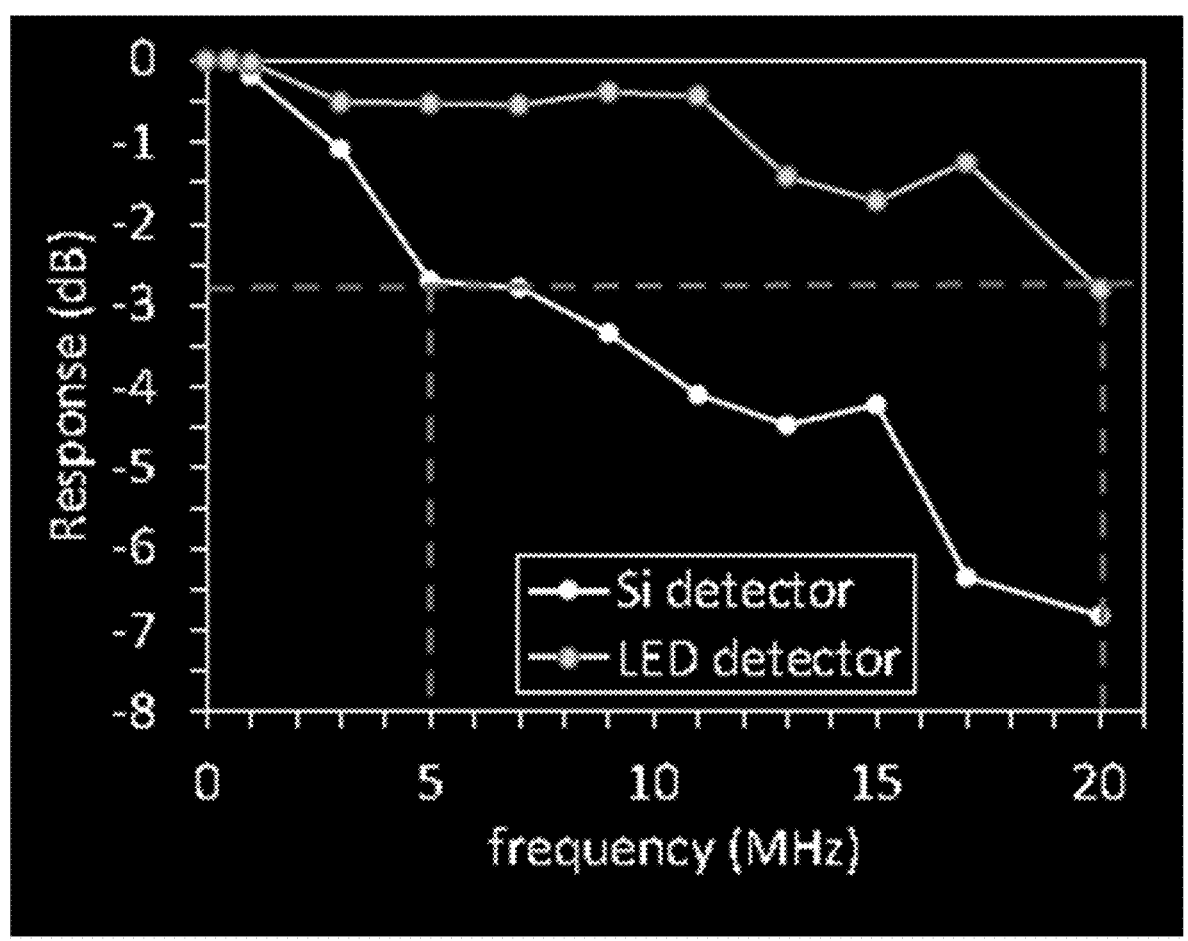
FIG. 7C is a plot of response (in decibels or dB) as a function of frequency (in megahertz or MHz) showing the response curve of a silicon photodiode and a green light emitting diode (LED) according to various embodiments.

FIG. 7C is a plot of response (in decibels or dB) as a function of frequency (in megahertz or MHz) showing the response curve of a silicon photodiode and a green light emitting diode (LED) according to various embodiments. FIG. 7C shows that the use of the green LED increases the 3 dB bandwidth from 5 MHz or 20 MHz, thus enabling fast LED—LED communications.

If the light beam is divergent, the intensity may reduce with the square of distance, which may significantly reduce the signal-to-noise ratio and speed of communications. Various embodiments may include a convex/Fresnel lens in front of the LED for focusing incoming white light during detection and collimating outgoing green light during emission.

Figure 8A:
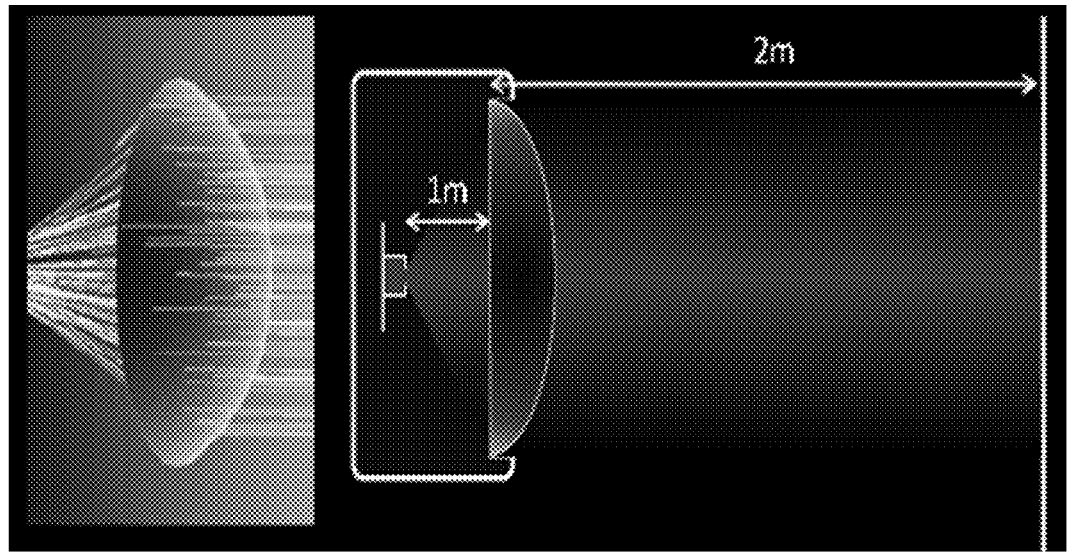
FIG. 8A shows a Zemax simulation of light directed to the light emitting diode using a convex lens according to various embodiments.
Figure 8B:
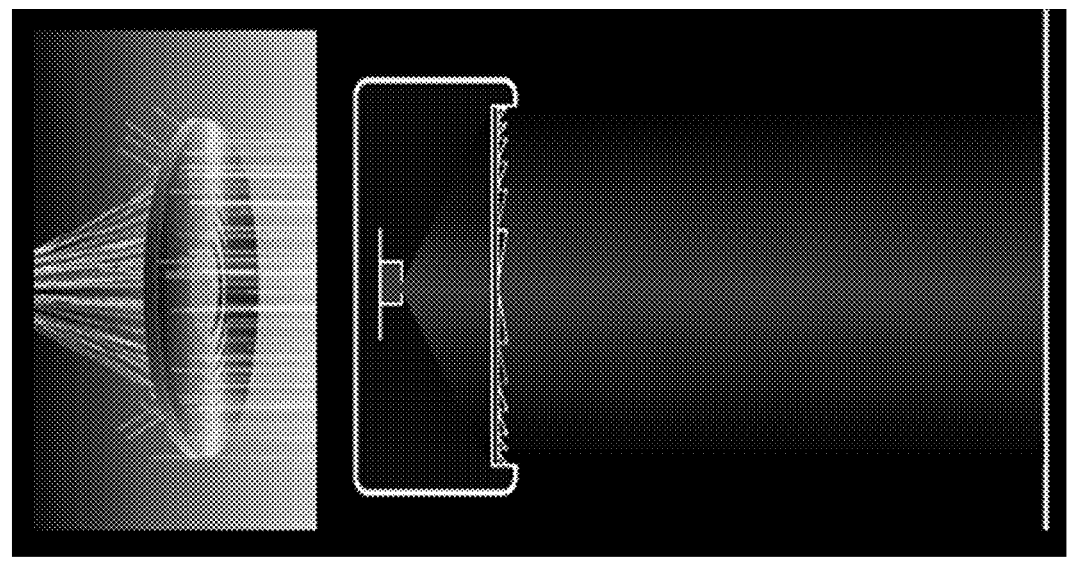
FIG. 8B shows a Zemax simulation of light directed to the light emitting diode using a Fresnel lens according to various embodiments.

FIG. 8A shows a Zemax simulation of light directed to the light emitting diode using a convex lens according to various embodiments. FIG. 8B shows a Zemax simulation of light directed to the light emitting diode using a Fresnel lens according to various embodiments. The focal length of the lens is 1 cm.

Figure 9A:
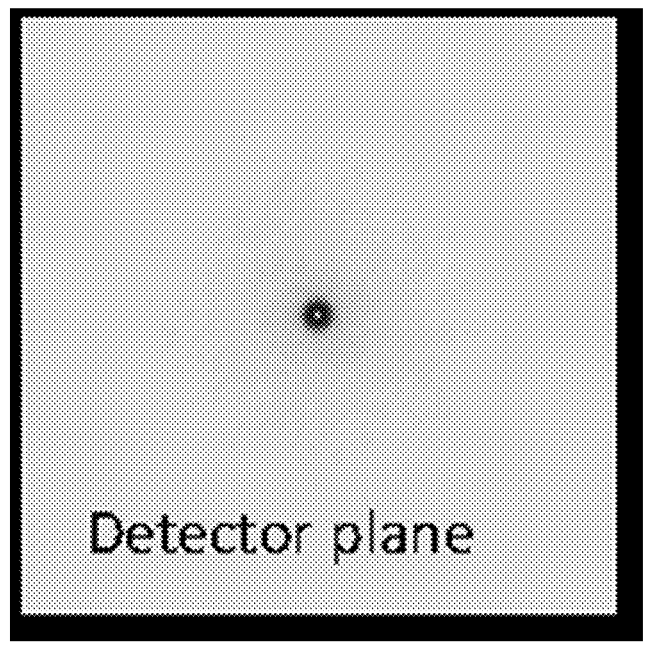
FIG. 9A shows a Zemax simulation of a beam spot detected at a detector by a convex lens placed 2 m away according to various embodiments.
Figure 9B:
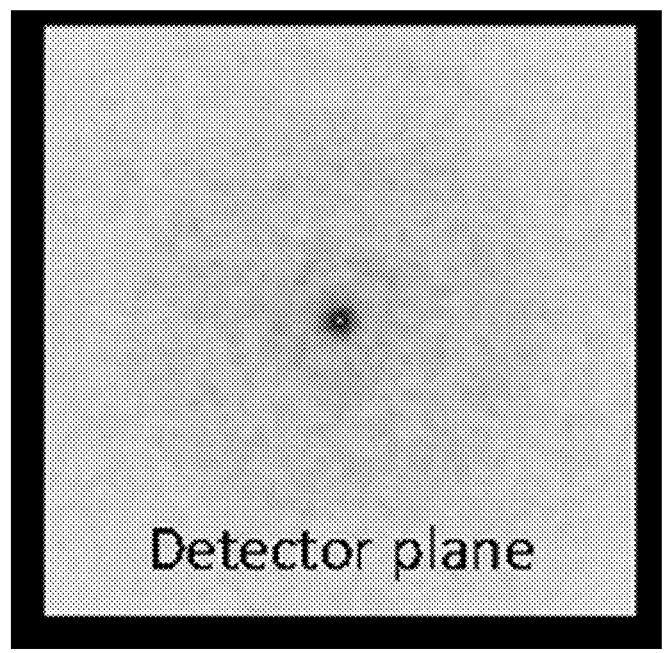
FIG. 9B shows a Zemax simulation of a beam spot detected at a detector by a Fresnel lens placed 2 m away according to various embodiments.
Figure 9C:
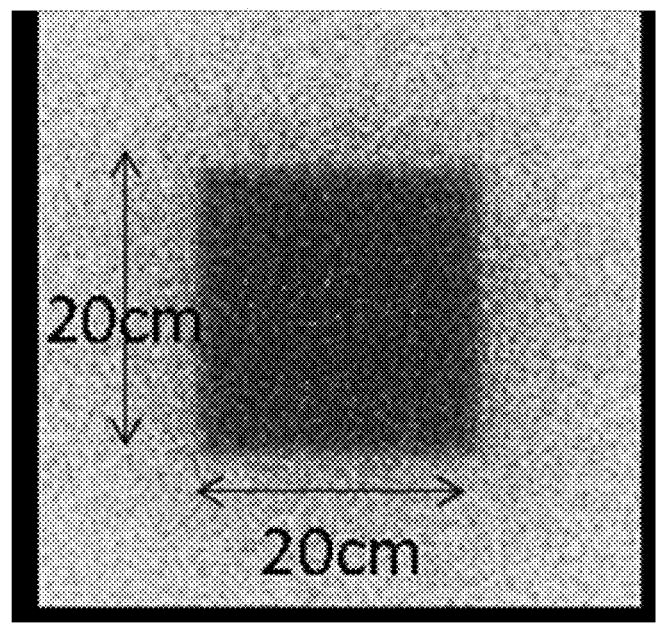
FIG. 9C shows a Zemax simulation of an image projected 2 m away from a light emitting diode emitter by a convex lens according to various embodiments.
Figure 9D:
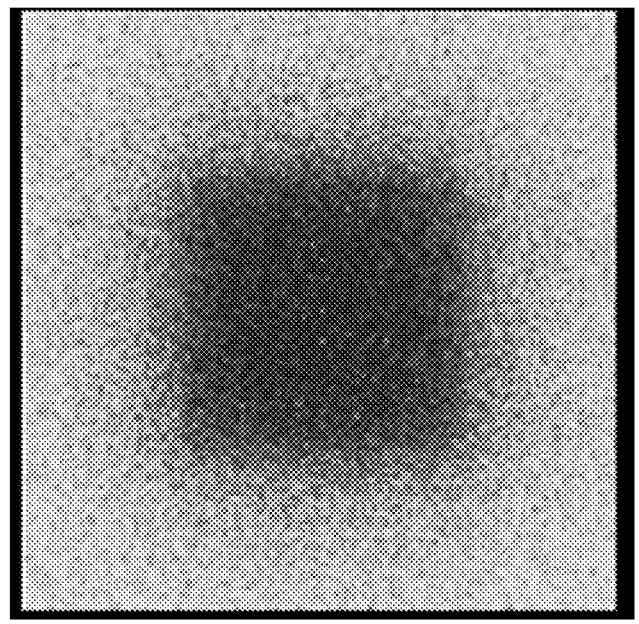
FIG. 9D shows a Zemax simulation of an image projected 2 m away from a light emitting diode emitter by a Fresnel lens according to various embodiments.

FIG. 9A shows a Zemax simulation of a beam spot detected at a detector by a convex lens placed 2 m away according to various embodiments. FIG. 9B shows a Zemax simulation of a beam spot detected at a detector by a Fresnel lens placed 2 m away according to various embodiments. FIG. 9C shows a Zemax simulation of an image projected 2 m away from a light emitting diode emitter by a convex lens according to various embodiments. FIG. 9D shows a Zemax simulation of an image projected 2 m away from a light emitting diode emitter by a Fresnel lens according to various embodiments.

FIG. 9E is a table comparing the optical properties of a spherical lens according to various embodiments and a Fresnel lens according to various embodiments.

By switching from a convex lens (spherical lens) to a flat lens (Fresnel lens), the thickness may be reduced from 3 mm to 0.5 mm and the volume taken up may be reduced from 130 mm$^3$ to 40 mm$^3$. Various embodiments including a combined emitter/detector and a Fresnel lens design may significantly reduce the size of the dongle by 3 times.

Various embodiments may include a 360° angle swivel, which may align the detector towards the ceiling lights and optimize the signal collection. The alignment may be further aided by the use of a visible uplink compared to an infrared one. The glare due to the visible light uplink may be reduced by collimation of the green light with the Fresnel lens.

Figure 10A:
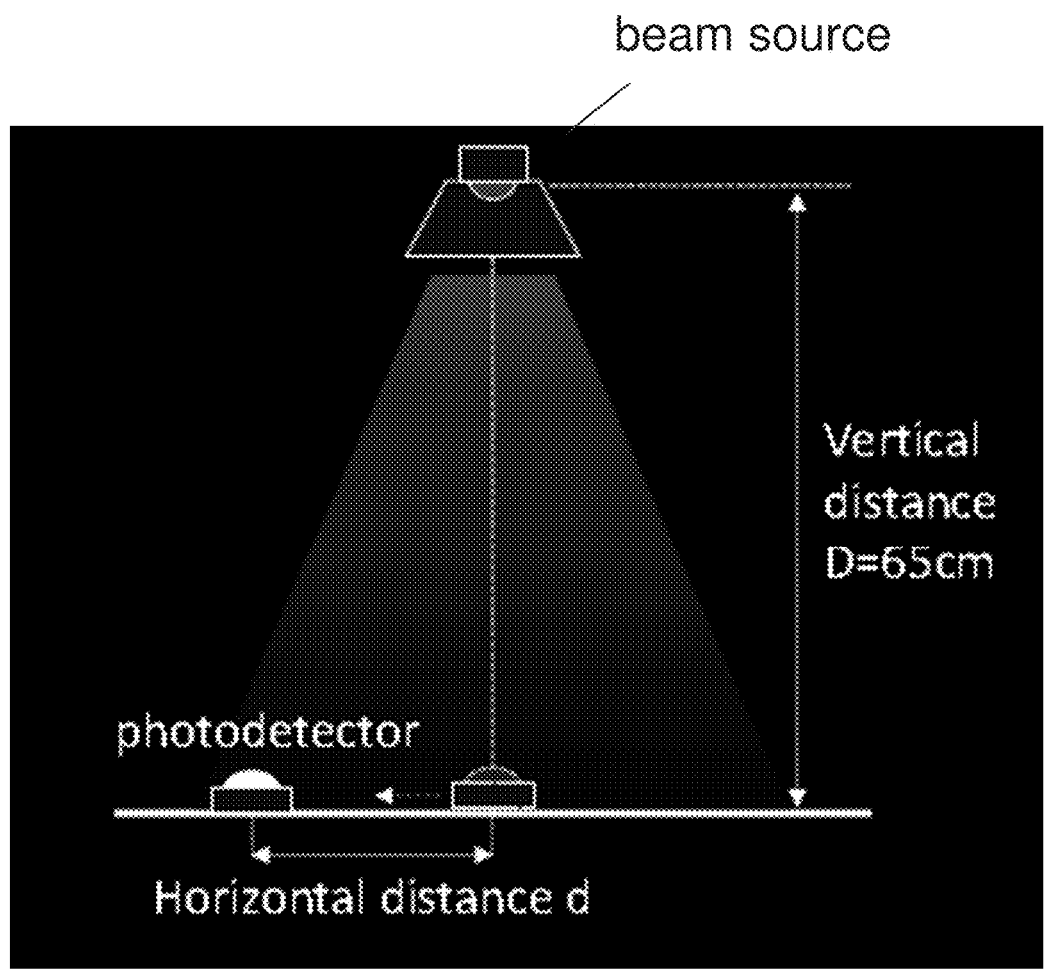
FIG. 10A illustrates a setup for determining the signal-to-noise ratio according to various embodiments.

Tests have been carried out to demonstrate the improvement in signal-to-noise ratio (SNR) by using a collimation lens. FIG. 10A illustrates a setup for determining the signal-to-noise ratio according to various embodiments. A photodetector with a collimation lens is placed at the centre of the beam axis. The photodetector is then moved away from the centre of the beam axis to the perimeter of the beam, and signal-to-noise (SNR) ratio as a function of the distance of the photodetector from the centre, d, may be plotted. The test may be repeated for a photodetector without a collimation lens.

Figure 10B:
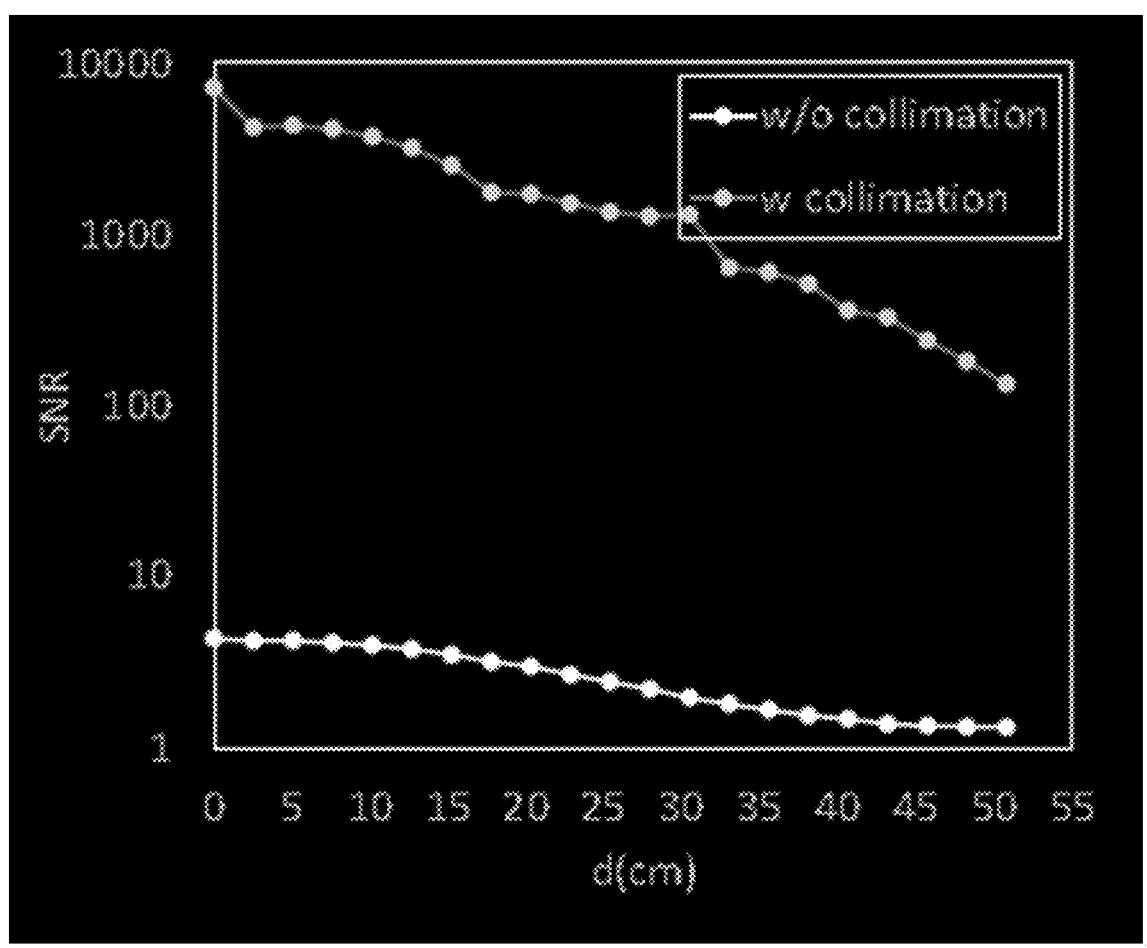
FIG. 10B is a plot of the signal-to-noise ratio (SNR) as a function of distance d (in centimetres or cm) demonstrating the signal-to-noise ratio (SNR) of a detector with collimation lens according to various embodiments and a detector without collimation lens according to various embodiments.

FIG. 10B is a plot of the signal-to-noise ratio (SNR) as a function of distance d (in centimetres or cm) demonstrating the signal-to-noise ratio (SNR) of a detector with collimation lens according to various embodiments and a detector without collimation lens according to various embodiments.

As seen from FIG. 10B, the SNR of the detector without collimation lens is very low and is further reduced as the detector is moved 50 cm from the beam axis centre. Including a collimation lens may improve the SNR by 1700 times. A reasonably good signal may be obtained when the detector with collimation lens is 50 cm away from the beam axis centre.

Various embodiments may be more compact, have higher speed and/or have higher SNR compared to existing devices. Various embodiments may be suitable for applications such as visible light communications or Li-Fi on laptops, tablets, and other mobile devices.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method of operating a light emitting diode (LED) communication device, the method comprising:
    coupling a communication interface of the light emitting diode (LED) communication device to an electronic device, the light emitting diode (LED) communication device further comprising an electrical interface coupled to the communication interface, and a light emitting diode electrically coupled to the electrical interface, wherein the electrical interface is configured to convert data signals received from the electronic device into driving signals transmitted to the light emitting diode during uplink, and to convert sensing signals received from the light emitting diode into data signals transmitted to the electronic device during downlink;
    providing an optical source so that the light emitting diode receives a plurality of downlink light pulses transmitted from the optical source to the light emitting diode, the plurality of downlink light pulses converted into the sensing signals by the light emitting diode; and
    providing a photodetector so that the light emitting diode transmits a plurality of uplink light pulses to the photodetector, the plurality of uplink light pulses converted based on the driving signals received by the light emitting diode;
    wherein the light emitting diode (LED) communication device comprises:
        a first housing part comprising the communication interface; and
        a second housing part comprising the light emitting diode and the electrical interface; and
    wherein the first housing part and the second housing part are configured to be rotatable relative to each other.

2. The method according to claim 1, wherein the downlink light is phosphor-based white light.

3. The method according to claim 1, wherein the uplink light is one or more selected from a group consisting of a green light, a blue light, and a blue-green light.

4. The method according to claim 1, wherein the light emitting diode is configured to reject components of the downlink light having a wavelength of more than 500 nm; and wherein the light emitting diode is configured to absorb components of the downlink light having a wavelength equal or less than 500 nm.

5. The method according to claim 1, wherein the uplink light is one or more selected from a group consisting of a yellow light, an orange light, a red light and an infrared light.

6. The method according to claim 5, wherein the light emitting diode is configured to reject components of the downlink light having a wavelength more than 980 nm; and wherein the light emitting diode is configured to absorb components of the downlink light having a wavelength less than 980 nm.

7. The method according to claim 1, wherein the plurality of downlink light pulses carries information to the electronic device via the communication interface; and wherein the plurality of uplink light pulses carries information from the electronic device via the communication interface.

8. The method according to claim 1, wherein the first housing part and the second housing part are configured to be rotatable to any value in a range from 0° to 360° relative to each other.

* * * * *